United States Patent
Sankar et al.

(10) Patent No.: US 8,117,146 B2
(45) Date of Patent: Feb. 14, 2012

(54) COMPUTING THE VALUES OF CONFIGURATION PARAMETERS FOR OPTIMAL PERFORMANCE OF ASSOCIATED APPLICATIONS

(75) Inventors: Raji Sankar, Bangalore (IN); Rahul Goyal, Bangalore (IN); Lalit Mangal, Jodhpur (IN)

(73) Assignee: Oracle International Corporation, Redwood Shores, CA (US)

( * ) Notice: Subject to any disclaimer, the term of this patent is extended or adjusted under 35 U.S.C. 154(b) by 968 days.

(21) Appl. No.: 12/106,357

(22) Filed: Apr. 21, 2008

(65) Prior Publication Data

US 2009/0210360 A1 Aug. 20, 2009

(30) Foreign Application Priority Data

Feb. 20, 2008 (IN) .............................. 425/CHE/2008

(51) Int. Cl.
*G06F 17/00* (2006.01)
*G06F 9/44* (2006.01)
*G06F 9/45* (2006.01)

(52) U.S. Cl. ............................. 706/47; 717/100; 703/22
(58) Field of Classification Search .................... None
See application file for complete search history.

(56) References Cited

U.S. PATENT DOCUMENTS

| 2008/0209445 | A1* | 8/2008 | Iyengar et al. | 719/320 |
| 2010/0268511 | A1* | 10/2010 | Kato et al. | 702/182 |

* cited by examiner

*Primary Examiner* — Alan Chen
(74) *Attorney, Agent, or Firm* — Narendra Reddy Thappeta

(57) ABSTRACT

Computing the values of configuration parameters for optimal performance of associated applications. In one embodiment, a rules data is maintained indicating a corresponding rule for each of the configuration parameters of an application sought to be optimized. Each rule specifies the manner of calculation of the corresponding configuration parameter based on a corresponding set of production metrics. On receiving an indication that the value of a specific configuration parameter is to be computed, the rules data is examined and a specific rule (indicating a set of production metrics) corresponding to the specific configuration parameter is identified. The corresponding values of each of the set of production metrics are then determined and the value for the specific configuration parameter is calculated using the identified rule and the estimated values of the set of production metrics.

20 Claims, 13 Drawing Sheets

421: <advisor name="ohs_advisor" targetType="oracle_apache" clientMetricName="ohs_server" clientMetricColumn="request.currentThroughput">
422:   <param name="MinSpareServers" >
423:     <rule host="linux" targetVersion="all" expression="round(avgrate(ohs_server.busyChildren.value))"/>
424:   </param>
425:   <param name="MaxSpareServers">
426:     <rule host="all" targetVersion="all" expression="round(maxrate(ohs_server.busyChildren.value))" />
427:   </param>
428: </advisor>

*FIG. 4A*

461: <advisor name="oc4j_advisor" targetType=" oc4j" clientMetricName="oc4j_all_instances_rollup" clientMetricColumn=" processRequest.throughput">
462:   <param name="stmt-cache-size">
463:     <rule host="all" targetVersion="all" expression=" avgcount(JDBC_Statement.Name)" />
464:   </param>
465: </advisor>

*FIG. 4B*

| | CollectionTime | TP | BC |
|---|---|---|---|
| 620 ← | | 622 | 623 |
| 651 → | 06-26 00:34 | 9 | 5 |
| 652 → | 06-26 01:34 | 9 | 5 |
| 653 → | 06-26 02:34 | 9 | 6 |
| 654 → | 06-26 03:34 | 9 | 9 |
| 655 → | 06-26 03:59 | 17 | 9 |
| 656 → | 06-26 04:34 | 16 | 8 |
| 657 → | 06-26 05:34 | 17 | 9 |
| 658 → | 06-26 06:34 | 18 | 10 |
| 659 → | 06-26 07:34 | 17 | 9 |
| 660 → | 06-26 08:34 | 18 | 10 |
| 661 → | 06-26 09:34 | 17 | 9 |
| 662 → | 06-26 10:34 | 17 | 9 |
| 663 → | 06-26 11:34 | 18 | 9 |
| 664 → | 06-26 12:34 | 18 | 10 |
| 665 → | 06-26 13:34 | 9 | 7 |
| 666 → | 06-26 14:34 | 9 | 5 |
| 667 → | 06-26 15:34 | 18 | 9 |
| 668 → | 06-26 16:34 | 19 | 10 |
| 669 → | 06-26 17:34 | 19 | 9 |
| 670 → | 06-26 18:34 | 20 | 9 |
| 671 → | 06-26 19:34 | 20 | 10 |
| 672 → | 06-26 20:34 | 19 | 6 |
| 673 → | 06-26 21:34 | 21 | 11 |
| 674 → | 06-26 22:34 | 21 | 11 |
| 675 → | 06-26 23:34 | 21 | 10 |
| 676 → | 06-26 23:59 | 21 | 10 |

| | CollectionTime | TP | Diff | % Diff |
|---|---|---|---|---|
| 851 → | 06-26 21:34 | 21 | 0 | 0 |
| 852 → | 06-26 22:34 | 21 | 0 | 0 |
| 853 → | 06-26 23:34 | 21 | 0 | 0 |
| 854 → | 06-26 23:59 | 21 | 0 | 0 |
| 855 → | 06-26 18:34 | 20 | 1 | 14.28 |
| 856 → | 06-26 19:34 | 20 | 0 | 0 |
| 857 → | 06-26 16:34 | 19 | 1 | 14.28 |
| 858 → | 06-26 17:34 | 19 | 0 | 0 |
| 859 → | 06-26 20:34 | 19 | 0 | 0 |
| 860 → | 06-26 06:34 | 18 | 1 | 14.28 |
| 861 → | 06-26 08:34 | 18 | 0 | 0 |
| 862 → | 06-26 11:34 | 18 | 0 | 0 |
| 863 → | 06-26 12:34 | 18 | 0 | 0 |
| 864 → | 06-26 15:34 | 18 | 0 | 0 |
| 865 → | 06-26 03:59 | 17 | 1 | 14.28 |
| 866 → | 06-26 05:34 | 17 | 0 | 0 |
| 867 → | 06-26 07:34 | 17 | 0 | 0 |
| 868 → | 06-26 09:34 | 17 | 0 | 0 |
| 869 → | 06-26 10:34 | 17 | 0 | 0 |
| 870 → | 06-26 04:34 | 16 | 1 | 14.28 |
| 871 → | 06-26 00:34 | 9 | 7 | 100 |
| 872 → | 06-26 01:34 | 9 | 0 | 0 |
| 873 → | 06-26 02:34 | 9 | 0 | 0 |
| 874 → | 06-26 03:34 | 9 | 0 | 0 |
| 875 → | 06-26 13:34 | 9 | 0 | 0 |
| 876 → | 06-26 14:34 | 9 | 0 | 0 |

(columns: 821, 822, 823, 824)

| | 921 | 922 | 923 |
|---|---|---|---|
| | CollectionTime | BC | Diff |
| 951 → | 06-26 03:34 | 9 | 0 |
| 952 → | 06-26 03:59 | 9 | 0 |
| 953 → | 06-26 04:34 | 8 | -1 |
| 954 → | 06-26 05:34 | 9 | 1 |
| 955 → | 06-26 06:34 | 10 | 1 |
| 956 → | 06-26 07:34 | 9 | -1 |
| 957 → | 06-26 08:34 | 10 | 1 |
| 958 → | 06-26 09:34 | 9 | -1 |
| 959 → | 06-26 10:34 | 9 | 0 |
| 960 → | 06-26 11:34 | 9 | 0 |
| 961 → | 06-26 12:34 | 10 | 1 |
| 962 → | 06-26 15:34 | 9 | 0 |
| 963 → | 06-26 16:34 | 10 | 1 |
| 964 → | 06-26 17:34 | 9 | -1 |
| 965 → | 06-26 18:34 | 9 | 0 |
| 966 → | 06-26 19:34 | 10 | 1 |
| 967 → | 06-26 20:34 | 6 | -4 |
| 968 → | 06-26 21:34 | 11 | 5 |
| 969 → | 06-26 22:34 | 11 | 0 |
| 970 → | 06-26 23:34 | 10 | 0 |
| 971 → | 06-26 23:59 | 10 | 0 |

COMPUTING THE VALUES OF CONFIGURATION PARAMETERS FOR OPTIMAL PERFORMANCE OF ASSOCIATED APPLICATIONS

RELATED APPLICATION

The present application is related to and claims priority from the co-pending India Patent Application entitled, "Computing The Values Of Configuration Parameters For Optimal Performance Of Associated Applications", Serial Number: 425/CHE/2008, Filed: Feb. 20, 2008, Applicant: Oracle International Corporation, naming the same inventors Raji Sankar, Rahul Goyal and Lalit Mangal as in the subject patent application, and is incorporated in its entirety herewith.

COPYRIGHT NOTICE

A portion of the disclosure of this patent document contains material which is subject to copyright protection. The copyright owner, Oracle International Corporation, has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

The present disclosure relates to system performance and more specifically to computing the values of configuration parameters for optimal performance of associated applications.

2. Related Art

An application refers to a software program, which on execution performs specific desired tasks. In general, several applications are executed in a run-time environment containing one or more of operating systems, virtual machines (e.g., supporting Java™ programming language), device drivers, etc., as is well known in the relevant arts.

Applications are often measured for the performance they deliver. The performance of an application may be characterized by measures such as the throughput rate (i.e., number of tasks/requests completed per unit time), response time, time outs, stability, etc.

The performance of an application is often dependent on the values to which various parameters (commonly referred to as configuration parameters) are setup. Each parameter has an associated value which is retrieved and used by instructions constituting the application during execution (or run time). The values affect the performance of the application for various reasons such as limiting the amount of resources the application may use, the manner of using a resource, etc.

The values may be set either due to configuration (e.g., by an administrator) or by various conditions occurring during operation of the application. One set of values for a configuration parameter may enhance the performance while another set of values may degrade the performance.

At least for such a reason, administrators/users of applications often spend substantial time/resources to compute the values of the configuration parameters for optimal performance of associated applications.

BRIEF DESCRIPTION OF THE DRAWINGS

Example embodiments of the present invention will be described with reference to the accompanying drawings briefly described below.

Each of FIGS. 4A and 4B depict a portion of a rules data indicating the rules corresponding to configuration parameters associated with an application (sought to be optimized) in one embodiment.

Figure 5:
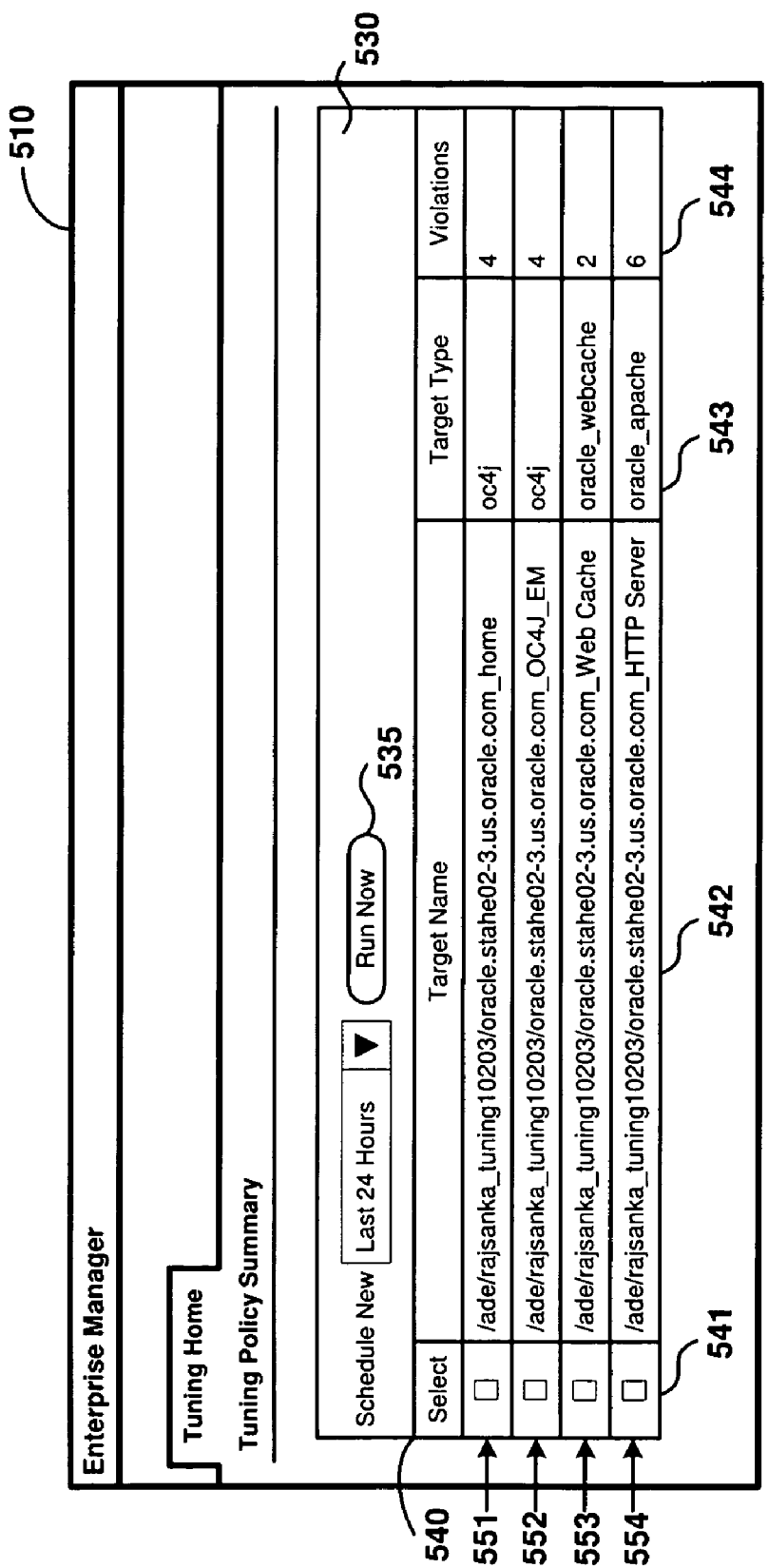

FIG. 5 depicts an interface using which the specific components (and the associated configuration parameters) of an enterprise application sought to be optimized is indicated in one embodiment.

FIG. 6 depicts a portion of a historical data indicating the values of various production metrics corresponding to different/multiple time instances in one embodiment.

Figure 7A:
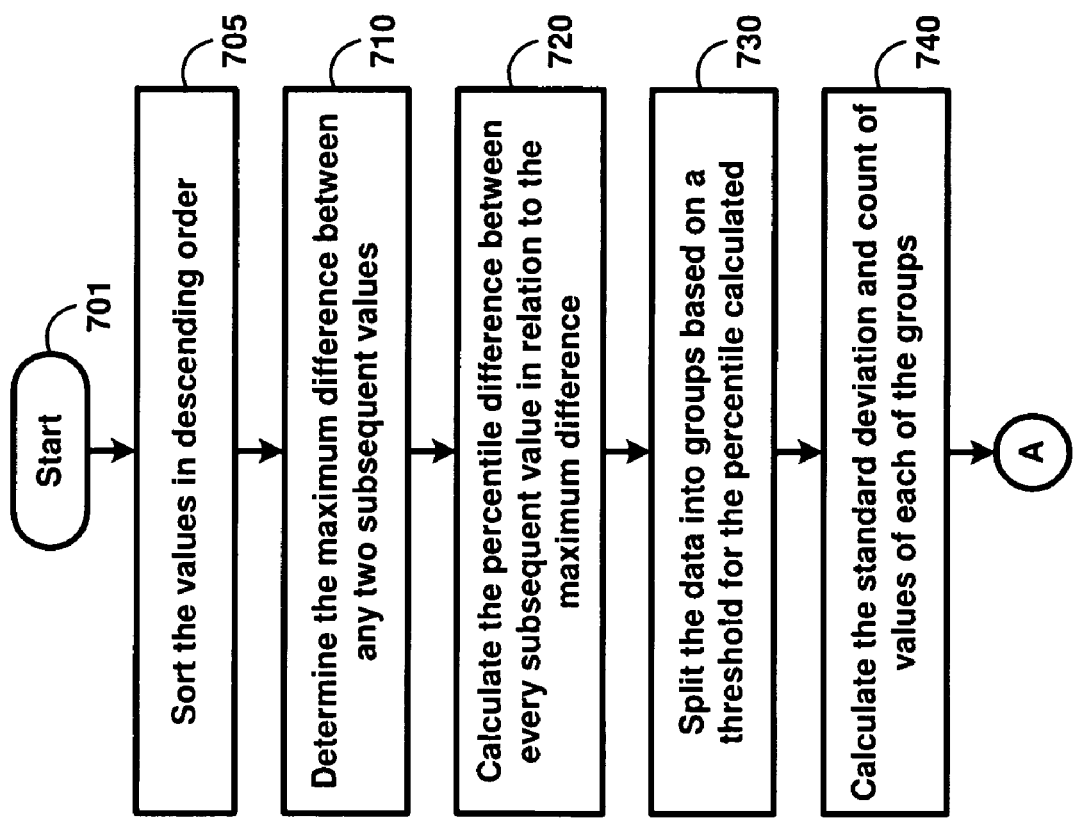
Figure 7B:
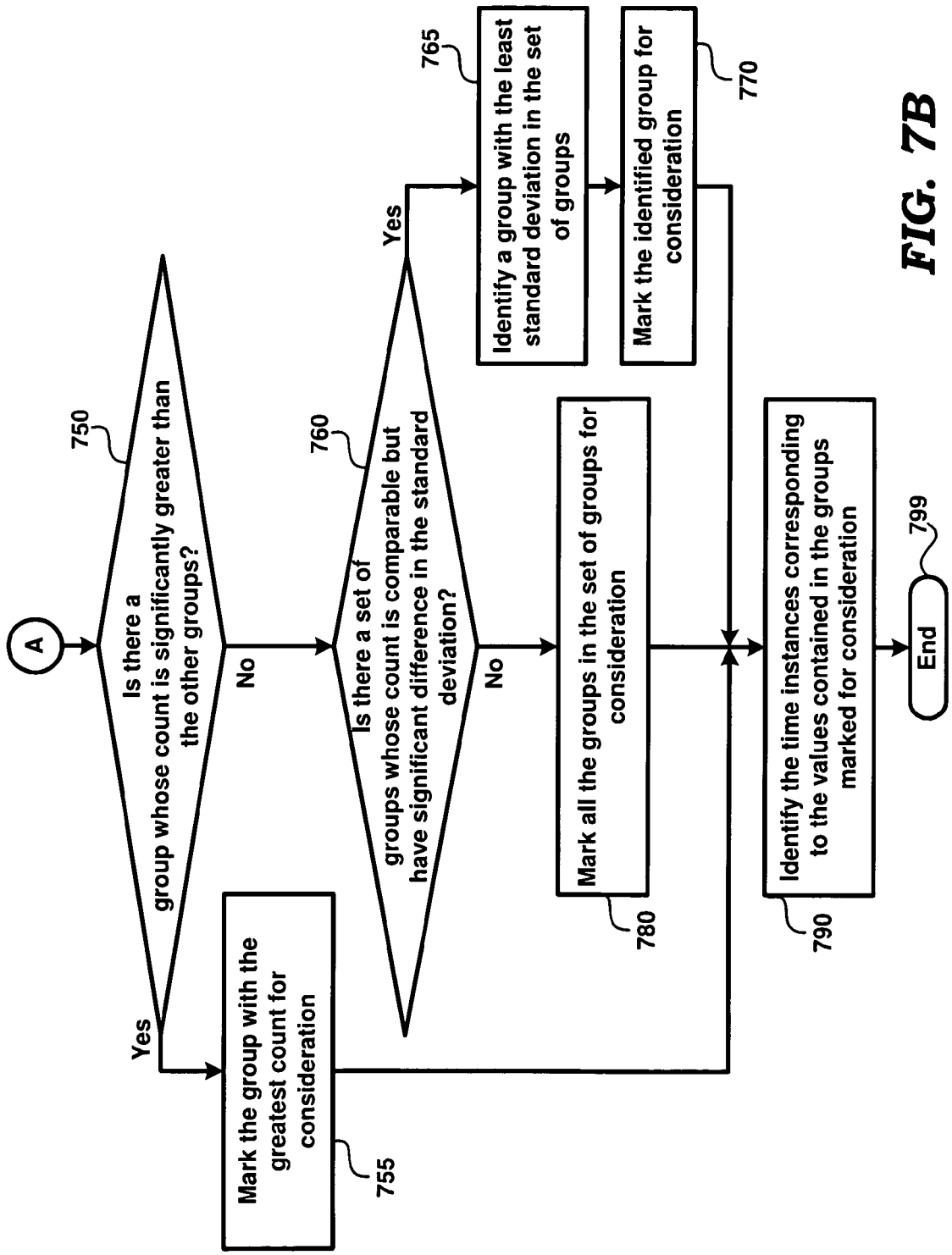

FIGS. 7A and 7B together is a flowchart illustrating the manner in which spikes (sets of very low/high values) in the values of production metrics maintained in historical data is recognized and removed according to an aspect of the present invention.

FIG. 8 depicts the manner in which time instances corresponding to the values of a production metric matching a desired criteria (non-spike values) are identified in one embodiment.

FIG. 9 depicts the manner in which values of a production metric are determined and then used to calculate associated configuration parameters in one embodiment.

Figure 10A:
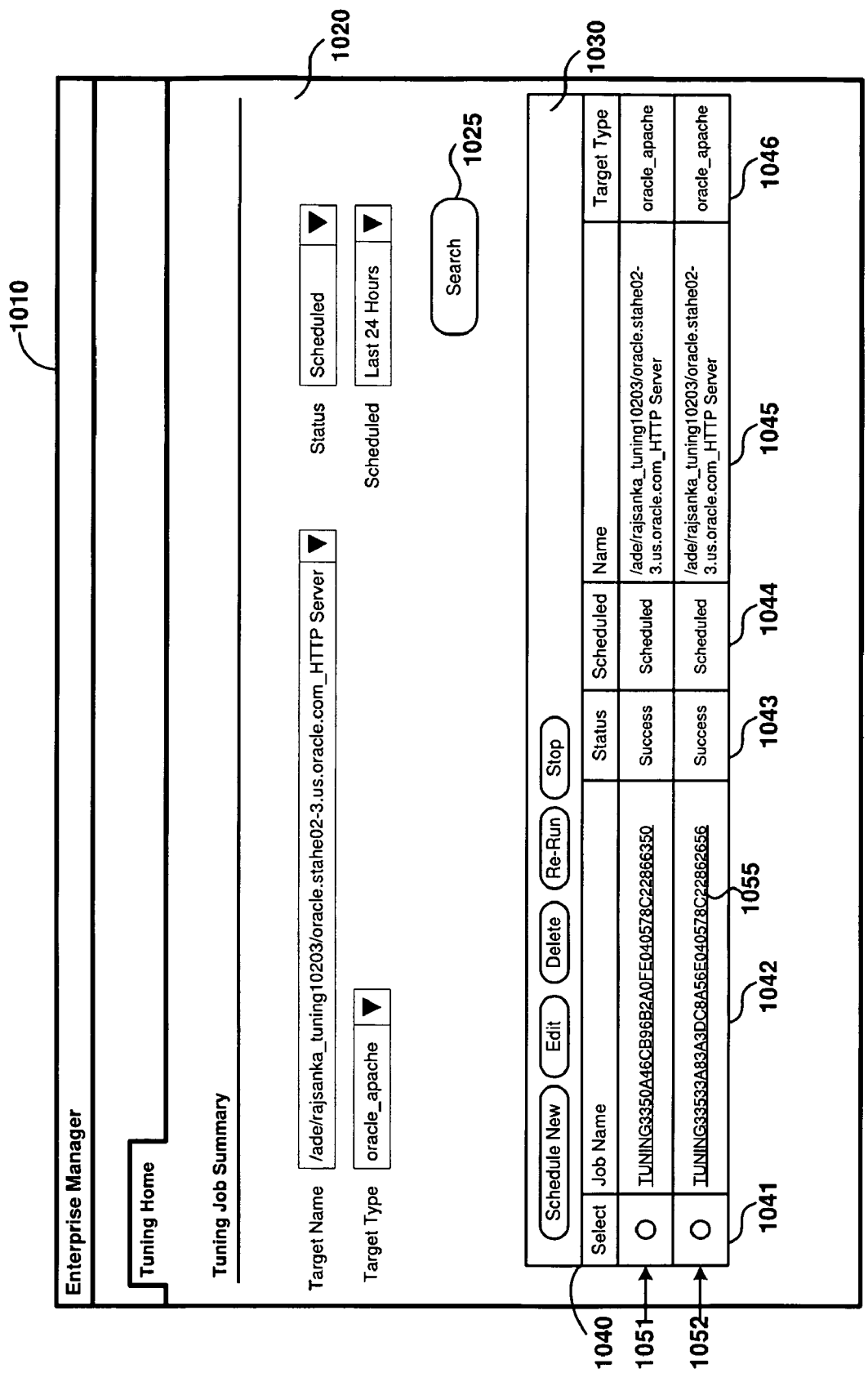

FIG. 10A depicts an interface displaying the result of performance of tuning/optimization of various components of an enterprise application in one embodiment.

Figure 10B:
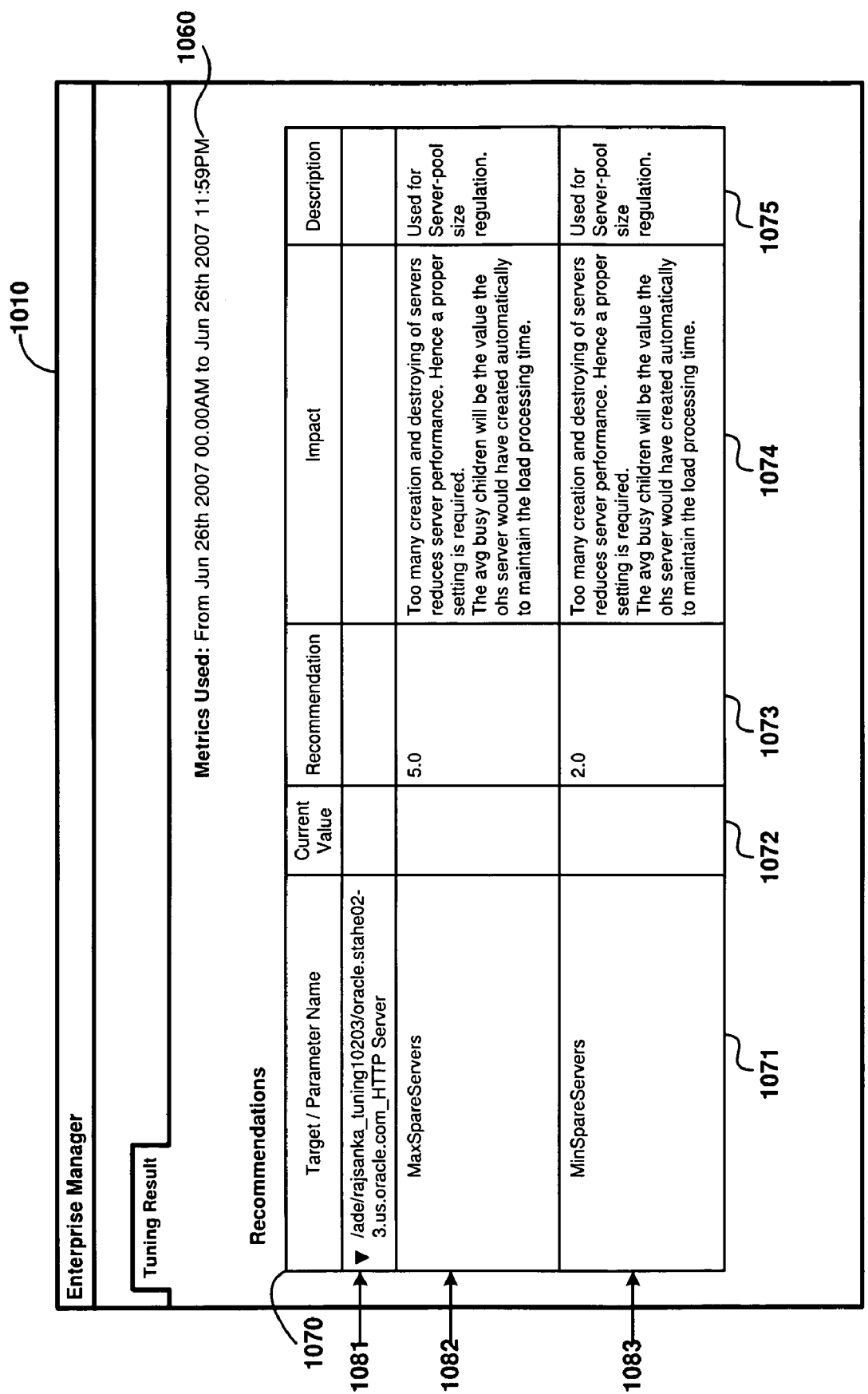

FIG. 10B depicts an interface displaying the details of the result of performance of tuning/optimization of a specific component of an enterprise application in one embodiment.

Figure 11:
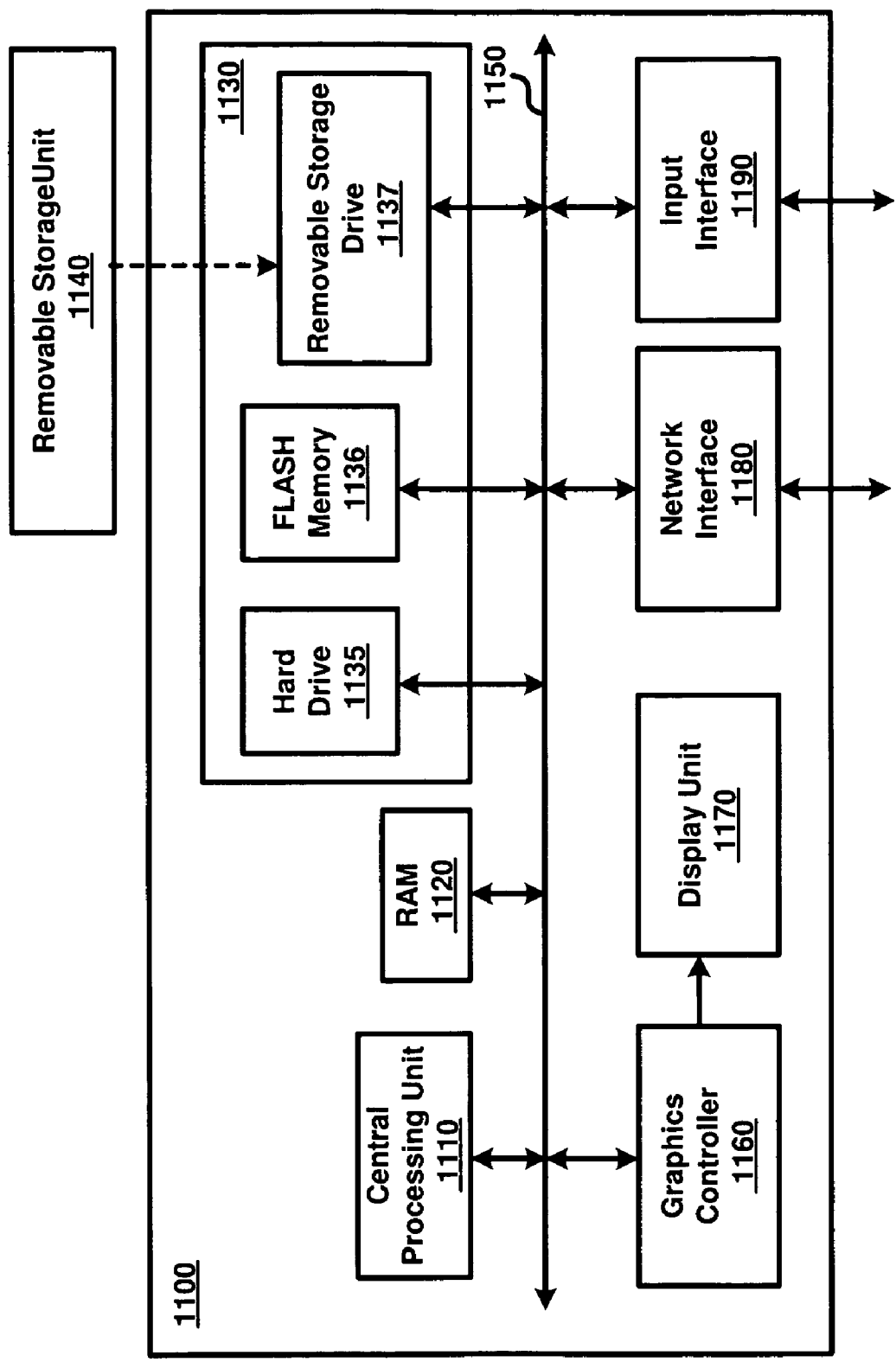

FIG. 11 is a block diagram illustrating the details of digital processing system 1100 in which various aspects of the present invention are operative by execution of appropriate software instructions.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention enables computation of the values of configuration parameters for optimal performance of an associated application. In one embodiment, a rules data is maintained indicating a corresponding rule for each of the configuration parameters of an application executing in a digital environment. Each rule specifies the manner of calculation of the corresponding configuration parameter based on a corresponding set of production metrics.

A production metric numerically represents a corresponding characteristic of the digital environment during execution of the application. For example, production metrics may indicate the total amount of memory available to the application for execution, the number of the threads created by the application, the number of connections created by the application with a specific database, etc.

On receiving an indication that the value of a configuration parameter of interest is to be determined, the rules data is examined and a specific rule corresponding to the configuration parameter is identified. The specific rule may indicate that the configuration parameter is to be calculated based on a set of production metrics. The corresponding values of each of the set of production metrics are then determined and the value of the configuration parameter is calculated using the identified rule and the determined values of the set of production metrics.

Thus, the computation of the values of configuration parameters for optimal performance of an application by administrators/users is simplified.

Another aspect of the present invention enables the administrator/user to download portions of the rules data from corresponding external systems and to merge the downloaded portions to form the desired rule data. Such a feature may be required in a scenario where the application contains different components executing on the same/different physical systems, with each portion of the rules data corresponding to each component contained in the application.

Thus, an administrator/user may create the rules data by downloading the relevant portions of the rules data corresponding to the various components of the application and merging them together. The ability to download the rules data corresponding to a specific component facilitates the rules data to be maintained in a common location by different administrators/users thereby leading to betterment of the rules for calculating the configuration parameters related to the specific component.

Yet another aspect of the present invention provides for maintaining a historical data indicating the previous values of each production metric corresponding to different/multiple time instances prior to the time instance at which the determination of the values of a production metric is being performed. The set of values of the production metric (used for calculating a configuration parameter) are then determined to be equal to the previous values of the production metric in a specific set of time instances.

One more aspect of the present invention enables the rules data to indicate that the values of a production metric is to be determined based on a specific criteria of a second (related) production metric. In such a scenario, the historical data is examined to determine the previous values of the second production metric corresponding to different/multiple time instances and a second set of time instances at which the previous values of the second production metric match the specific criteria is identified. The second set of time instances are then used as the specific set of time instances for determining the previous values of the production metric as being the set of values to be used for calculating the value of a configuration parameter.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, with other methods, or combining one more aspects/features described herein, etc. In other instances, well-known structures or operations are not shown in detail to avoid obscuring the features of the invention.

2. Example Environment

Figure 1:
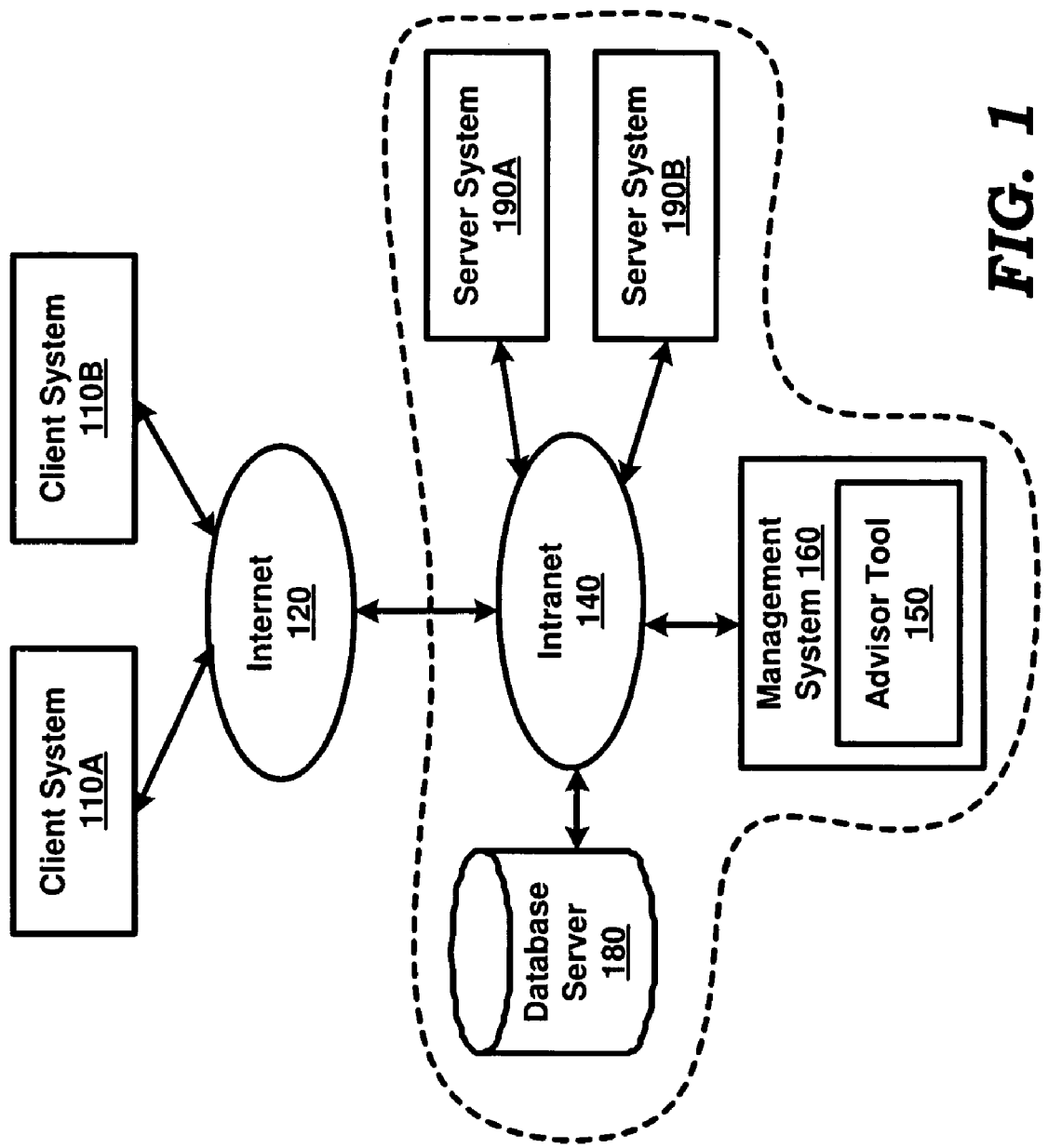
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 10A-110B, internet 120, intranet 140, management system 160 (containing advisor tool 150), database server 180 and server systems 190A-190B.

Merely for illustration, only representative number/type of systems is shown in the Figure. Many environments often contain many more systems, both in number and type, depending on the purpose for which the environment is designed. Each system/device of FIG. 1 is described below in further detail.

Intranet 140 represents a network providing connectivity between server systems 190A-190B, database server 180 and management system 160, all provided within an enterprise (shown with dotted boundaries). Internet 120 extends the connectivity of these with client systems 110A/110B.

Each of intranet 140 and Internet 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Database server 180 facilitates storage and retrieval of a collection of data. Database server 180 stores data used (generated or stored) by applications in processing various client requests. In one embodiment, database server 180 is implemented using relational database technologies and therefore provides storage and retrieval of data using structured queries such as SQL.

Each of client systems 110A-110B represents a system such as a personal computer, workstation, mobile station, etc., used by a user to generate (client) requests to software applications executing in server systems 190A-190B. The requests may be generated according to a suitable interface. In general, a client system requests an application for performing operations (to achieve desired tasks) and receives corresponding responses containing the results of performance of the requested operations.

Each of server systems 190A-190B represents a server, such as a web/application server, which executes software applications capable of performing operations requested by client systems 110A-110B. A server system may perform the operations on data maintained internally or on external data (stored in database server 180) and then send the result of performance of the operations to the requesting client system.

As noted above, server systems 190A-190B, database server 180 and management system 160 (together with intranet 140 providing connectivity among the systems) may be implemented in a single "enterprise". In general, the combined systems/servers (excluding the network, which merely provides data transport), shown within the dotted area, may be executing an enterprise application, with the various tiers (or components) of the enterprise application being executed on the various systems such as server system 190A and database server 180. Alternatively, each server system may execute an independent application, which processes the corresponding requests received from the client systems.

The performance of applications (executing in server systems 190A-190B) may be dependent on corresponding configuration parameters defining the operation of various devices/systems of the computing system. The configuration parameters may be set with different sets of values, with one specific set ("one or more") of values causing the optimal performance of the application.

In one prior approach, an administrator/user determines the values of the configuration parameters for the optimal performance of an application based on prior knowledge/ experience, white papers, guides (such as administration guide, sizing guide, etc.) provided by a vendor of the application, etc., and sets the parameters to the determined values. Such an approach requires the administrator/user to spend considerable amount of time and/or resources in determining the values of the configuration parameters.

Management system 160 provided according to an aspect of the present invention enables computation of the values of the configuration parameters for optimal performance of applications executing on server systems 190A and 190B as described below with examples. In an embodiment, such features are operative by execution of software instructions constituting advisor tool 150, and accordingly the description below is provided with respect to advisor tool 150.

3. Computing the Values of Configuration Parameters for Optimal Performance

Figure 2:
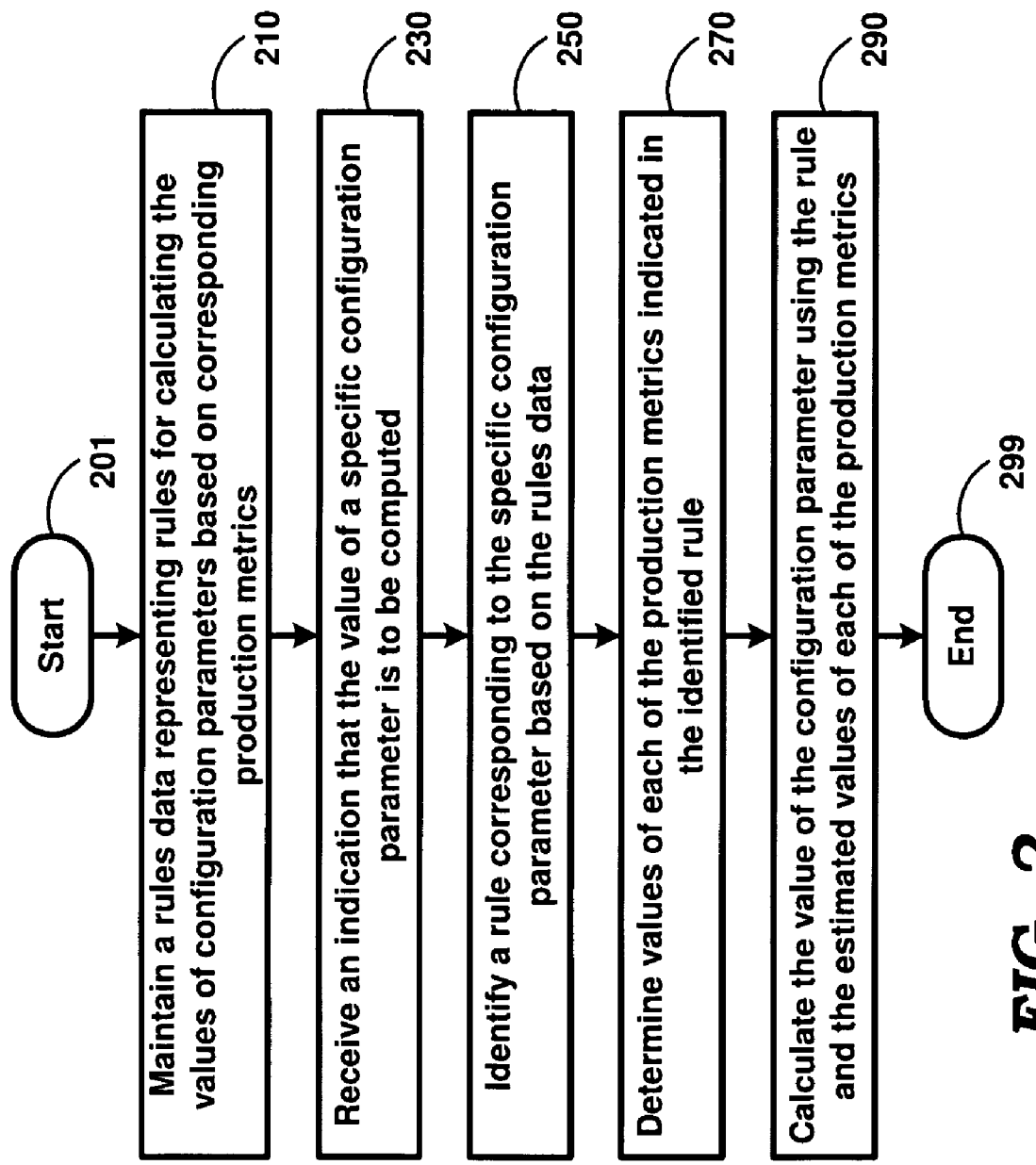
FIG. 2 is a flowchart illustrating the manner in which the values of configuration parameters causing optimal performance of an application are determined according to an aspect of the present invention.

FIG. 2 is a flowchart illustrating the manner in which the values of configuration parameters causing optimal performance of an application are computed according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, advisor tool 150 maintains rules data representing rules for calculating the values of configuration parameters (of an application sought to be optimized) based on corresponding production metrics. In one embodiment, each rule is expressed in the form of one or more equations containing the production metrics as variables, whose values are to be substituted in the equations for computing the value of the configuration parameter. However, alternative embodiments can be implemented with more elaborate mechanisms (e.g., a detailed procedure with several instructions) without departing from the scope and spirit of several aspects of the present invention.

The rules may be specified by an administrator/user or may be received from an external system. In one embodiment, an administrator/user downloads portions of the rules data from corresponding external systems (each portion corresponding to a component of the application sought to be optimized) and stores the downloaded portions as part of the rules data. The rules data may be maintained in database server 180 or a local storage (not shown in FIG. 1) associated with management system 160.

In step 230, advisor tool 150 receives an indication that the value of a specific configuration parameter is to be computed. In one embodiment, the indication is received when an administrator/user selects the parameter from a displayed set of parameters corresponding to the application that is sought to be optimized.

Alternatively, an administrator/user may select only the application (or a component) to be optimized from a displayed set of applications, and the current approach may be performed with each of the configuration parameters associated with the selected application (or component). In general, the indications may deemed to be received based on either manual inputs or appropriate program logic.

In step 250, advisor tool 150 identifies a rule corresponding to the specific configuration parameter (to be computed) based on the rules data. The identification may be performed based on the name/description (or any other identifier) of the indicated configuration parameter. The identified rule may indicate that the computation of the configuration parameter requires a specific set of production metrics.

In step 270, advisor tool 150 determines the values of each of the production metrics indicated in the identified rule. The determination of the values of the production metrics may be performed in any known way. For example, an administrator/user may be requested to specify the current/desired values of each of the production metrics. Alternatively, advisor tool 150 may communicate with specific applications designed to provide the values of the corresponding production metrics.

In one embodiment described below, a historical data indicating the previous values of each production metric corresponding to different/multiple time instances prior to the current time instance is maintained. The historical data may be maintained by advisor tool 150 or specific applications designed to provide the values of the corresponding production metrics. The values of a specific production metric are then determined to be equal to the previous values of the specific production metric in a specific set of time instances. However, alternative approaches can be used to estimate the values based on historical data.

In step 290, advisor tool 150 calculates the value of the configuration parameter using the rule and the estimated values of each of the production metrics. The calculation may be performed by substituting the values of the production metrics (determined in step 270) in the equation specified by the rule (identified in step 250) and then performing the operations (such as '+', '−', '*', 'avg', 'max' etc.) specified in the equation in a known way.

The resultant calculated value of the specific configuration parameter (desired to be computed) may then be displayed on a display unit (not shown in FIG. 1) connected to management system 160. The calculated value may also be stored in volatile/non-volatile memory (for example in a hard disk or a database) for later retrieval. The flow chart ends in step 299.

Thus, an administrator/user may compute the values of the desired configuration parameters for the optimal performance of a desired application. The administrator/user may then configure (set) the configuration parameters to the computed values in a known way.

For example, the administrator/user may modify a text file (used by an application to provide configuration) by substituting/adding the computed values associated with the desired configuration parameters thereby causing the application to perform optimally (an acceptable level of performance, which can potentially fall within an acceptable range).

The description is continued illustrating the manner in which values of configuration parameters for optimal performance of an application are computed in one embodiment.

4. Example Illustrating Computation of Values

FIGS. 3, 4A, 4B, 5, 6, 7, 8, and 9 together illustrate the manner in which values of configuration parameters for optimal performance of an application are computed in one embodiment. Each of the Figures is described in detail below, with the description continued with respect to a specific environment in which several aspects of the present invention can be implemented in one embodiment.

Figure 3:
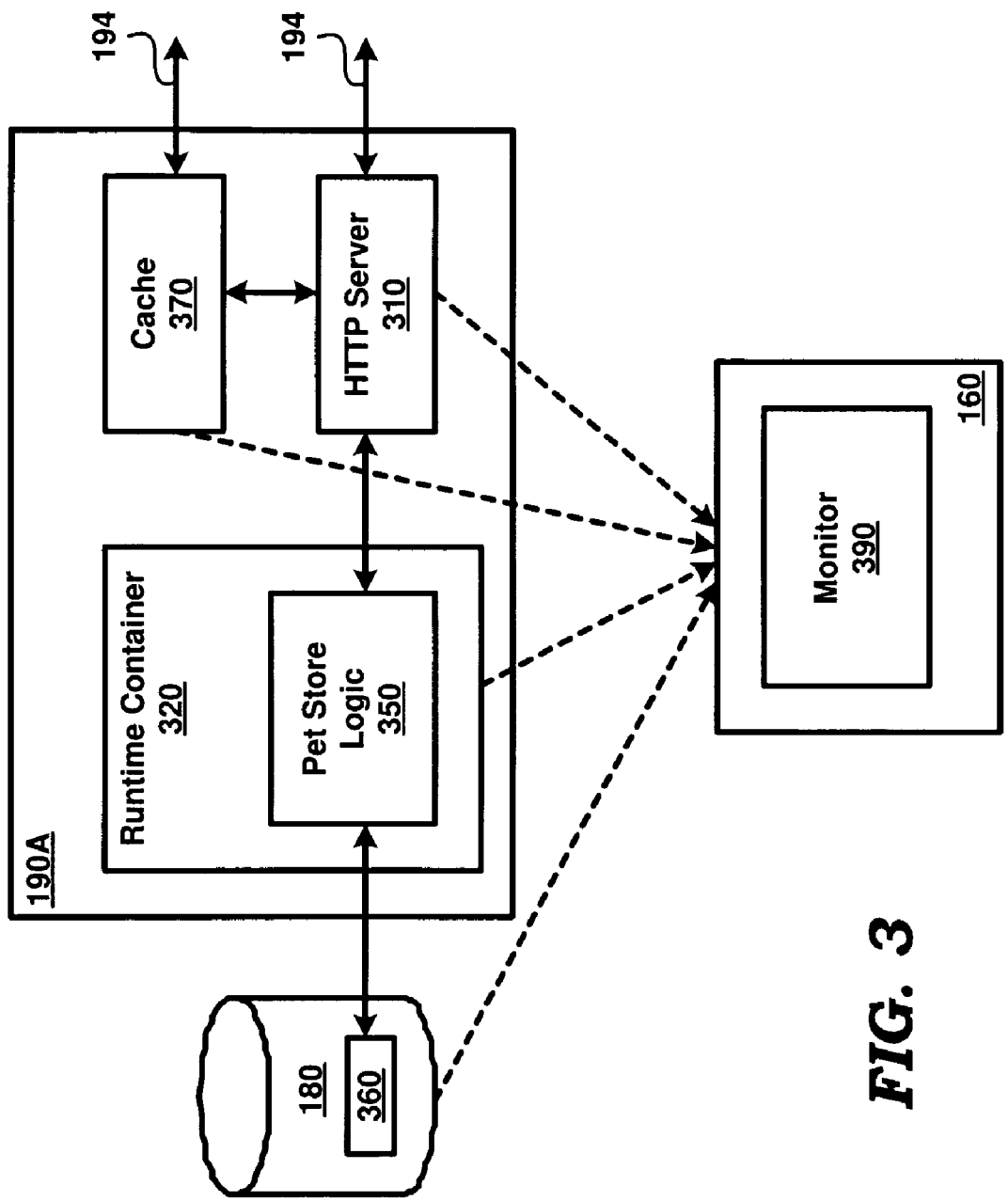
FIG. 3 is a block diagram illustrating the details of an enterprise application desired to be optimized in one embodiment.

FIG. 3 is a block diagram illustrating the details of an enterprise application desired to be optimized in one embodiment. However, the features of the invention can be applied in other environments (from other vendors, operating systems, virtual machines, etc.) as well, as will be apparent to one skilled in the relevant arts by reading the disclosure provided herein.

Server 190A corresponds to a Linux system (that is, a system operating with the Linux operating system) and is shown executing HTTP server 310, runtime container 320, and cache 370. Linux may refer to one of a family of operating systems available from various organizations (for example, Red Hat Linux from Red Hat, Inc.).

HTTP server 310 is designed to serve web pages in response to client requests (received via path 194) and acts as a front end to pet store logic 350 executing in the environment provided by runtime container 320. Pet store logic 350 contains business logic, which generates/determines the web pages to be served to the client and the content thereof, based on the URLs contained in the client requests. Cache 370 maintains copies of the web pages served previously by HTTP server 310 in an associated local storage. Cache 370 is also designed to serve web pages in response to client requests (received via path 194) if the requested web pages exist in the local storage and to forward the client requests to HTTP server 310 otherwise.

In one embodiment, HTTP server 310, runtime container 320 and cache 370 are respectively implemented using Oracle™ HTTP Server, OC4J (Oracle Container for Java), and WebCache products available from Oracle™ Corporation. In another embodiment, HTTP server 310 is implemented using Apache HTTP server available from Apache Software Foundation, while runtime container 320 is implemented using Websphere Application Server available from IBM Corporation.

Pet store logic 350 may generate/determine the web pages (to be sent in response to client requests) and content thereof, based on data 360 contained in database server 180. Database server 180 may correspond to a Windows™ XP system (available from Microsoft™ Corporation) executing an instance of an Oracle™ XE Database product available from Oracle™ Corporation.

Management system 160 may correspond to a Linux System executing another instance of the OC4J providing a runtime environment for an enterprise manager application represented by monitor 390. Monitor 390 (enterprise manager application) enables an administrator/user to manage/configure different aspects of HTTP server 310 and runtime container 320 executing in server 190A. Monitor 390 also enables the administrator/user to set the computed values of the configuration parameters associated with the different components of the enterprise application.

Further, monitor 390 also collects (monitors and obtains) the various production metrics associated with HTTP server 310, runtime container 320, cache 370 and database server 180 from the corresponding software (represented as dotted lines). Monitor 390 then may maintain the monitored values in a non-volatile memory (for example in a database in database server 180). The monitored values may then be retrieved and used by advisor tool 150 in computing the various configuration parameters associated with the enterprise application.

Thus, the various components of the enterprise application such as HTTP server 310, runtime container 320, pet store logic 350, data 360 and cache 370 (representing different components of an enterprise application) operate together to enable different users to access various web pages related to a pet store (for performing operations such as buying/selling of pets). It may be desirable that the performance of such an (enterprise) application be optimized.

It may be appreciated that the performance of the (enterprise) application may depend on the values set for the configuration parameters associated with the various components constituting the application. The values of the configuration parameters may be computed based on corresponding rules and the associated production metrics. The manner in which rules data (containing the rules) corresponding to configuration parameters of an application is maintained is described below with examples.

5. Maintaining Rules Data

Each of FIGS. 4A and 4B depict a portion of a rules data indicating the rules corresponding to configuration parameters associated with an application (sought to be optimized) in one embodiment. Though the content of FIGS. 4A and 4B is shown encoded in extensible markup language (XML) according to one convention, other encoding/formats and conventions may be used for representing the data.

Referring to FIG. 4A, lines 421-428 (between tags "<advisor>" and "</advisor>") depict the various configuration parameters associated with HTTP server 310 (as indicated by the value "oracle_apache" corresponding to the attribute "targetType" in line 421).

Line 421 further indicates that the various production metrics used for computing corresponding configuration parameters are to be determined based on the production metric "ohs_server.request.currentThroughput" (the concatenation of the values of the attributes "clientMetricName" and "clientMetricColumn").

Each of lines 422-424 and 425-427 (between tags "<param>" and "</param>") depicts the details of a configuration parameter associated with HTTP server 310 (one of the components of the application sought to be optimized).

Lines 422-424 depict the details of a single parameter "MinSpareServers" (as indicated by the value of the attribute "name" in line 332). In particular, line 423 (tag "<rule/>") specifies an equation "round(avgrate(ohs_server.busyChildren.value))" for computing the configuration parameter (as indicated by the value of the attribute "expression").

It may be observed that the variable "ohs_server.busyChildren" contained in the equation represents a specific production metric whose values are to be determined and used (substituted) for calculating the value of the configuration parameter "MinSpareServers" based on the above equation.

Line 423 further indicates that the rule is applicable to all versions of "linux" systems (as indicated by the respective values of the attributes "targetVersion" and "host"). Though not shown, it may be appreciated that different rules corresponding to various combinations of operating systems and their versions may be provided in the rules data to facilitate more accurate computation of the values of the configuration parameters. Similarly, lines 425-427 depict the details of another parameter "MaxSpareServers" associated with HTTP server 310.

It may be appreciated that the configuration parameters "MinSpareServers" and "MaxSpareServers" are used for server-pool size regulation, that is, they control how many spare (unused) child processes HTTP server 310 keeps alive while waiting for client requests. Setting a high value for "MaxSpareServers" can cause resource problems (since each child process consumes resources). Similarly, setting a low value for "MinSpareServers" can cause new child processes to be forked (a costly operation). It may therefore be desirable that the values of the configuration parameters causing optimal performance be computed.

It may be observed that the "optimal" values of the configuration parameters "MinSpareServers" and "MaxSpareServers" are computed/calculated based on the values of the production metric "ohs_server.busyChildren", which indicate the number of child process that were in use (busy) at corresponding time instances.

It may be desirable that only a specific set of values (for example, matching a criteria) of the production metric "ohs_server.busyChildren" be used for calculating the values of the corresponding configuration parameters. For example, the criteria may indicate that the values of the production metric "ohs_server.busyChildren" corresponding to the time instances when the load (number of client requests served per unit time) of HTTP server 310 is significantly low or high be not used in calculating the values of the configuration parameters.

In one scenario, the values of the production metric "ohs_server.busyChildren" may not be indicative of the actual load of HTTP server 310, with a more accurate indicator being the values of the production metric "ohs_server..request.currentThroughput" (which indicates the number of requests which were actually served/responded). As such the values of the production metric "ohs_server.request.currentThroughput" matching the above example criteria may be used to identify the time instances at which the corresponding values of the production metric "ohs_server.busyChildren" are to be estimated for calculating the configuration parameters.

Referring to FIG. 4B, lines 461-465 depicts configuration parameters associated with runtime container 320 (as indicated by the value "oc4j" for the attribute "targetType" in line 461). Further line 461 indicates that the various production metrics (used for calculating configuration parameters associated with runtime container 320) are to be determined based on the production metric "ocj_all_instances rollup.processRequest.Throughput".

The details of various configuration parameters associated with runtime container 320 (and other components of the enterprise application) may be specified similar to the configuration parameters for HTTP server 310 (as described in detail above) and therefore the description is not repeated for conciseness. A partial list of configuration parameters is included in the Appendix, as a part of the present specification. A brief description of the parameters and the manner of calculation (rules) is also included there. The above-described approaches can be further used to interpret the information there in generating corresponding portions of rules data.

Thus, an administrator/user may specify the rules/equations for calculating the configuration parameters associated with the different components of an enterprise application. The administrator/user may then upload the portions of rules data corresponding to each specific component to a system (in one embodiment, provided external to the enterprise), thereby enabling other administrators/users to download and use the portions of rules data.

It may be appreciated that such sharing of information may enable an administrator/user to download portions of rules data (from external systems) corresponding to specific components of the enterprise application desired to be optimized. The different portions may then be merged and maintained as a single rules data for the entire enterprise application. Alternatively, the different portions of the rules data may be maintained independently, with advisor tool 150 inspecting the appropriate portion of rules data for identifying the rule corresponding to the specific configuration parameter sought to be computed.

In one embodiment, the different portions of rules data (downloaded from external systems) are displayed on a display unit (provided associated with management system 160, not shown in FIG. 1), thereby enabling an administrator/user to customize the rules as desired. The customized portions are then merged into a single rules data and maintained in a database in database server 180 (or as a file in a local file system).

Thus, rules data is generated and maintained by administrators/users. The rules data may then be used to identify a rule corresponding to specific configuration parameters in response to receiving corresponding indications. In one embodiment, an administrator/user specifies a set of policies/alerts for determining the optimal performance of an enterprise application (with the satisfaction of all the policies indicating optimal performance). The administrator/user is then provided a list of components having policy violations (non-satisfaction), thereby enabling the administrator/user to select the desired component for optimization. Accordingly, the indication to compute specific configuration parameters is received in response to an administrator/user selecting the desired component of an enterprise application for optimization as described below with examples.

6. Receiving Indications for Computing Configuration Parameters

FIG. 5 depicts an interface using which the specific components (and the associated configuration parameters) of an enterprise application sought to be optimized is indicated in one embodiment.

Display area 510 (titled "Enterprise Manager") enables an administrator/user to indicate the specific components of the enterprise application that are to be tuned/optimized. Display area 510 may represent a portion of a screen that may be displayed by advisor tool 150 on a display unit (not shown) associated with management system 160.

Display area 530 enables an administrator to specify various actions associated with the components selected in column 541. For example, the administrator may select a desired time range "Last 24 Hours" (indicting the time instances used to determine the values of the production metrics) in the select field and click on button 535 (labeled "Run Now") to cause execution of the tuning/optimizing process for the selected components.

Table 540 depicts the different components constituting an enterprise application. Column 541 enables an administrator to select desired components (by selecting the corresponding checkboxes). Columns 542, 543 and 544 (respectively labeled "Target Name", "Target Type" and "Violations") respectively specify the name (or location), the type and the number of policy violations for each of the components.

Each of rows 551-554 depicts the details of a component of the enterprise application. In particular, row 544 indicates a component of the enterprise application with name "/ade/rajsanka_tuning10203/oracle.stahe02-3.us.oracle.com_HTTP Server" and of type "oracle_apache". It may be appreciated that in one embodiment, the components specified in rows 551-554 correspond to runtime container 320, monitor 390, cache 370, and HTTP server 310 of FIG. 3.

Thus, a user may select row 544 and click on button 535 to indicate that HTTP server 310 of the enterprise application is to be optimized. On receiving such an indication, advisor tool 150 determines the configuration parameters that are related to the selected HTTP server 310 based on the rules data. Thus, advisor tool 150 may determine that the configuration parameters "MinSpareServers" and "MaxSpareServers" indicated in lines 422-427 of FIG. 4A (based on target type "oracle_apache" of HTTP server 310) are sought to be optimized, thereby indicating that the values of the determined configuration parameters are to be computed.

Advisor tool 150 may then identify that both of the configuration parameters are based on the values of the production metric "ohs_server.busyChildren". As described above, advisor tool 150 also determines that the values of the production metric "ohs_server.busyChildren" are to be determined based on the values of the production metric "ohs_server.request.currentThroughput" (as indicated in line 421).

In one embodiment, the values of the different production metrics corresponding to multiple time instances are maintained as a historical data, described below with examples.

7. Maintaining Historical Data

FIG. 6 depicts a portion of a historical data indicating the values of various production metrics corresponding to different/multiple time instances in one embodiment. The historical data may be generated/updated by advisor tool 150 using the monitored values stored by monitor 390 as described in detail above. The historical data may be maintained in a database (not shown) local to management system 160 or in database server 180.

Though only the values of the production metrics required for calculating the configuration parameters associated with HTTP server 310 (as indicated by the rules data in FIG. 4A) are depicted in FIG. 6, it may be appreciated that in alternative embodiments, the values of other production metrics may also be maintained in the historical data.

Similarly, only the values of the production metrics corresponding to time instances between time "00:00" and "24:00" (24 hour format) of day "06-26" (month-day) are depicted in FIG. 6 (based on the time range "Last 24 Hours" selected in FIG. 5). The time instances at which the values of the production metrics are to be stored and the set of time instances to be used corresponding to each production metric may be appropriately chosen based on the configuration parameters desired to be calculated. Further, the time instances may be specified using any desired format in a known way.

Table 620 indicates the values of productions metrics collected (monitored and obtained) at various time instances. Column 621 (labeled "CollectionTime") indicates the time instance at which the corresponding production metrics are collected or stored in the historical data. Columns 622 and 623 (labeled "TP" and "BC") respectively specify the values of the production metrics "ohs_server.request.currentThroughput" and "ohs_server.busyChildren" (hereafter referred to as "TP" and "BC" respectively) corresponding to each of the time instances depicted in column 621.

Each of rows 651-676 indicates the time instance and the corresponding values of the production metrics. For example row 651 indicates the respective values "9" and "5" of the productions metrics TP and BC at time instance "06-26 00:34" (that is at time "00:34" on date "06-26"). Similarly, other rows indicate the values of TP and BC corresponding to other time instances.

It may be observed that the values of TP in rows 651-654 and 665-666 are considerably lower than the other values indicating a lower load on HTTP server 310 at the corresponding time instances. Such sets of very low (or very high) values are referred to as spikes and it may be desirable that the time instances corresponding to the spikes be not used in calculating the values of configuration parameters.

Thus, advisor tool 150 may examine the values of the production metric TP (shown in column 622) to identify a specific set of time instances at which the values of TP match a specific criteria (that is, they are non-spike values). Advisor tool 150 may then use the values of the production metric BC corresponding to the identified specific set of time instances in calculating the associated configuration parameters.

It may be appreciated that any desired criteria (pre-determined or as specified by an administrator/user) may be used for the identification of the specific set of time instances. In one embodiment, only the time instances corresponding to the non-spike values of the production metric TP are included in the specific set of time instances. As such, the description is continued describing the manner in which spikes in historical data are recognized and removed in one embodiment.

8. Removing Spikes from Historical Data

FIGS. 7A and 7B together is a flowchart illustrating the manner in which spikes (sets of very low/high values) in the values of production metrics maintained in historical data is recognized and removed according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 701, in which control immediately passes to step 705.

In step 705, advisor tool 150 sorts the values (and the corresponding time instances) in descending order. In step 710, advisor tool 150 determines the maximum difference between any two subsequent values (that is the values which are subsequent in the descending order).

In step 720, advisor tool 150 calculates the percentile difference between every subsequent value in relation to the maximum difference. The percentile difference may be calculated by dividing the difference between the subsequent values by the maximum difference and then multiplying by 100.

In step 730, advisor tool 150 splits the data into groups based on a threshold for the percentile (difference) calculated. The threshold may be predefined or may be specified by an administrator/user. In step 740, advisor tool 150 calculates the standard deviation and count of values of each of the groups (determined in step 730).

In step 750, advisor tool 150 checks whether a group whose count is significantly greater than the other groups is present. Control passes to step 755 if such a group exists and to step 760 otherwise. In step 755, advisor tool 150 marks the group with the greatest count for consideration. Control then passes to step 790.

In step 760, advisor tool 150 checks whether a set of groups whose count is comparable but having significant difference in the standard deviation is present. Control passes to step 765 if such a set of groups exist and to step 780 otherwise.

In step 765, advisor tool 150 identifies a group with the least standard deviation in the set of groups. In step 770, advisor tool marks the identified group for consideration. Control then passes to step 790.

In step 780, advisor tool 150 marks all the groups in the set of groups for consideration (since the count and the standard deviation are comparable among the set of groups). In step 790, advisor tool 150 identifies the time instances corresponding to the values contained in the groups marked for consideration. The identified time instances are used to determine the values of the production metric to be used in calculating associated configuration parameters. The flow chart ends in step 799.

Thus, by identifying and marking groups of values according to the steps of FIGS. 7A and 7B, the spikes in the historical data may be recognized and removed. It may be appreciated that the steps may be applied to the determined values of a production metric to remove the spikes and then used to calculate the configuration parameters.

Alternatively, the steps may be applicable to the values of another production metric (such as TP) for identifying the time instances based on which the estimated values of the production metric (BC) are determined. The manner in which the values of the production metric TP and the corresponding time instances depicted in FIG. 6 are processed according to the steps of FIG. 7 is described below with examples.

9. Determining Time Instances

FIG. 8 depicts the manner in which time instances corresponding to the values of a production metric matching a desired criteria (non-spike values) are identified in one embodiment.

As described above, advisor tool 150 may process the values of production metric TP to recognize and remove spikes. Advisor tool 150 may then identify the time instances corresponding to the resultant set of values after removal of spikes for calculating the configuration parameters. Accordingly, advisor tool 150 may examine the values in table 620 (of FIG. 6) and then generate the data depicted in FIG. 8 in any suitable form (for example, as a table) convenient for removal of spikes.

Column 821 (labeled "CollectionTime") indicates the time instance at which the values are stored in the historical data, while column 822 (labeled "TP") specify the values of the production metric TP corresponding to each of the time instances depicted in column 821. It may be observed that the pairs of time instances and values (columns 821 and 822) depicted in rows 851-876 are similar to the pairs of time instances and values (columns 621 and 622) in FIG. 6, except that the pairs in rows 851-876 are sorted in the descending order of the value in column 822 (as per step 705).

Column 823 (labeled "Diff") depicts the difference between subsequent values of the production metric TP depicted in column 822. For example, the value of Diff "1" in row 855 is calculated as the difference between the respective values "21" and "20" of TP (column 822) in rows 854 and 855. Similarly the values of column 823 corresponding to rows 851-876 are calculated. The maximum value "7" (corresponding to row 871) in column 823 may then be determined to be the maximum difference between any two subsequent value (as per step 710).

Column 824 (labeled "% Diff") indicates the percentile difference between any two subsequent values. The percentile difference may be calculated (as per step 720) by dividing that corresponding value in column 823 by the maximum difference and then multiplying by 100.

Thus in row 855, the percentile difference is calculated as (1/7)*100=14.28 (as indicated by the corresponding value in column 824). Similarly the percentile differences of other rows 851-876 are also calculated. It may be observed that for the row having the maximum difference (row 871) the percentile difference is 100.

In one embodiment, the values are divided into two groups based on a threshold of 80% for the percentile difference, with one group having a percentile difference less than the threshold and the other group having a percentile difference greater than the threshold. As such, a first group consisting of the values 21-16 having percentile less than 80% (rows 851-870) and a second group consisting of the value 9 having percentile greater than 80% (rows 871-876) are formed (as per step 730).

The standard deviation and the count of the first group are calculated to be 1.5 and 20 respectively, while for the second group is calculated to be 0 and 6 respectively (as per step 740). The standard deviation of the groups may be calculated in a known way as will be apparent to one skilled in the relevant arts.

It may be observed that the count "20" of the first group is significantly greater than the count "6" of the second group. As such the first group is marked for consideration (as per steps 750 and 755). The time instances corresponding to the values (21-16) contained in the first groups marked for consideration is identified as the time instances to be used for calculating the configuration parameters (as per step 790).

Thus, only the time instances between "06-26 03:59" and "06-26 12:34" and the time instances between "06-26 15:34" and "06-26 23:59" are identified for calculation. As such, only the values of the production metric BP corresponding to the identified time instances are used to calculate the values of the associated configuration parameters "MinSpareServers" and "MaxSpareServers" as described below with examples.

10. Calculating the Value of Configuration Parameters

FIG. 9 depicts the manner in which values of a production metric are used to calculate associated configuration parameters in one embodiment. Advisor tool 150 may examine the data depicted in FIGS. 6 and 8 and then generate (a portion of) the data depicted in FIG. 9 in any suitable form (for example, a table) facilitating calculation of the configuration parameters.

Column 921 (labeled "CollectionTime") indicates the time instance at which the values are stored in the historical data, while column 922 (labeled "BC") specifies the values of the production metric BC corresponding to each of the time instances depicted in column 921. Column 923 (labeled "Diff") indicates the difference between subsequent values of the production metric BC depicted in column 922.

It may be appreciated that the difference in subsequent values (in column 923) is generated to facilitate calculation of the rate function ("avgrate" and "maxrate") used in calculating the value of the configuration parameters "MinSpareServers" and "MaxSpareServers", as is well known in the relevant arts. Other columns (based on other requirements) may similarly be generated to facilitate calculation of other configuration parameters.

Rows 951-971 depict the time instances at which the corresponding values of a production metric (BC) are to be used for calculating associated configuration parameters. It may be observed that the time instances (column 921) of rows 951-971 are between the ranges "06-26 03:59" to "06-26 12:34" and "06-26 15:34" to "06-26 23:59" (identified in relation to the production metric TP as described in detail above). It may be further observed that the pairs of time instances and values (columns 921 and 922) in rows 951-971 are similar to the pairs of time instances and values (columns 621 and 623) in rows 655-664 and 667-676 of FIG. 6.

The values in column 923 (difference in subsequent values) of rows 951-971 may be generated similar to the generation of the values in column 823 and therefore not described for conciseness. The value of the difference in row 962 is generated as "0" (instead of "−1") since the values between the time instances "06-26 12:34" and "06-26 15:34" are ignored.

Thus, the table of FIG. 9 depicts the estimated values of the production metric BC that are to be used for calculating the associated configuration parameters "MinSpareServers" and "MaxSpareServers". As indicated above, the positive values in column 923 (difference of subsequent values) indicate the rate of production BC at corresponding time instances. Thus the values 1, 1, 1, 1, 1, 1, 5 (corresponding to rows 954, 955, 957, 961, 963, 966, and 968) of the production metric BP are used to calculate the values of the configuration parameters as described below.

The value of the configuration parameter "MinSpareServers" is calculated based on the rule specified in line 423 as:

$$MinSpareServers = \text{round}(\text{avgrate}(ohs\_server.busyChildrenvalue))$$
$$= \text{round}((1+1+1+1+1+1+5)/7)$$
$$= \text{round}(1.57)$$
$$= 2.0$$

The value of the configuration parameter "MaxSpareServers" is calculated based on the rule specified in line 426 as:

$$MaxSpareServers = \text{round}(\text{maxrate}(ohs\_server.busyChildrenvalue))$$
$$= \text{round}(\max(1, 1, 1, 1, 1, 1, 5))$$
$$= 5.0$$

Thus the values of the configuration parameters "MinSpareServers" and "MaxSpareServers" are determined to be 2.0 and 5.0 respectively. An administrator/user may set the values of the configuration parameters to the determined values as described in detail above. In one embodiment, the determined values are displayed on a display unit (not shown) associated with management system 160 as described below with examples.

11. Displaying Determined Values of Configuration Parameters

FIGS. 10A and 10B together illustrate the manner in which the determined values of configuration parameters are displayed in one embodiment. Each of the Figures is described in detail below.

FIG. 10A depicts an interface displaying the result of performance of tuning/optimization of various components of an enterprise application in one embodiment. The various components of the enterprise application to be tuned/optimized may be specified by an administrator/user using the interface depicted in FIG. 5 as described in detail above.

Display area 1010 (titled "Enterprise Manager") enables an administrator/user to view the results of performance of tuning/optimization of various components of an enterprise application. Display area 1010 may represent a portion of a screen that may be displayed by advisor tool 150 on a display unit (not shown) associated with management system 160.

Display area 1020 enables an administrator to search for specific components based on target name, target type, status and scheduled times (shown as respective select fields). For example, an administrator may select HTTP server as the target name and "oracle_apache" as the target type, the status as "Scheduled" and the scheduled time range as "Last 24 hours" and then click on button 1025 (labeled "Search") to view the results of performance of tuning/optimization of HTTP server 310.

Display area 1030 enables an administrator to specify various actions associated with the components selected in column 1041. For example, an administrator may select the button labeled "Re-Run" to cause the tuning/optimization process of the selected components to be repeated.

Table 1040 depicts the results of performance of tuning/optimization of different components constituting an enterprise application. Table 1040 may be displayed in response to an administrator clicking/selecting button 1025 after selecting the desired criteria (using the select fields provided in display area 1020). Table 1040 may then display the specific tuning/optimizations performed matching the selected criteria.

Column 1041 enables an administrator to select a desired component (by selecting one of the corresponding radio buttons). Column 1042 (labeled "Job Name") indicates a name associated with the execution of the tuning/optimization process. In one embodiment, the job name is generated by advisor tool 150 on receiving an indication that a specific component is to be tuned/optimized. It may be observed that each of the job names is provided as a link (such as link 1055) enabling the administrator to view the details of the result of performance of the tuning/optimization of the corresponding component.

Columns 1043, 1044, 1045 and 1046 (respectively labeled "Status", "Scheduled", "Target Name", and "Target Type") respectively specify the status, the scheduled status, the name (or location) of the component, and the type of the component for each of the tuning/optimizations performed.

Each of rows 1051-1052 depicts the result of performance of a corresponding tuning/optimization of the enterprise application. In particular, row 1052 indicates one instance (with job name "TUNING33533A83A3DC8A56E040578C22862656") of the performance of tuning/optimization of a component of the enterprise application with name "/ade/rajsanka_tuning10203/oracle.stahe02-3.us.oracle.com_HTTP Server" (corresponding to HTTP server 310) and of type "oracle_apache". Row 1052 further indicates the status of performance as "Success" and that the job was "Scheduled" to be executed at a specific time.

An administrator/user may select/click on link 1055 (corresponding to row 1052) to view the details of the results. In response, advisor tool 150 may display the details of the result of performance of tuning/optimization of the corresponding component (HTTP Server 310) as described below with examples.

FIG. 10B depicts an interface displaying the details of the result of performance of tuning/optimization of a specific component of an enterprise application in one embodiment. The content of display area 1010 may be displayed in response to an administrator/user selecting a job (by clicking on the appropriate link) in FIG. 10A.

The description is continued assuming that an administrator/user has clicked on link 1055, thereby causing the details of the results of performance of tuning/optimization of HTTP server 310 to be displayed in display area 1010. Thus, advisor tool 150 may display the details of the configuration parameters "MinSpareServers" and "MaxSpareServers" (associated with HTTP server 310), including the determined values of the configuration parameters (as described above with respect to FIG. 9).

Text 1060 indicates the time range used for determining the production metrics and to calculate the configuration parameters. As such, text 1060 indicates that the time instances between "Jun. 26, 2007 00:00 AM" and "Jun. 26, 2007 11:59 PM" have been used to calculate the displayed values of the configuration parameters. It may be observed that the time instances indicated are similar to the time instances used in FIGS. 6, 8 and 9 to determine the values of the configuration parameters "MinSpareServers" and "MaxSpareServers".

Table 1070 depicts the details of the result of performance of tuning/optimization of a specific component (HTTP server 310) of an enterprise application. Column 1071 (labeled "Target/Parameter Name") displays the name (location) of the specific component or the configuration parameters associated with the specific component.

Columns 1072, 1073, 1074 and 1075 (respectively labeled "Current Value", "Recommendation", "Impact", and "Description") respectively specify the current values, the recommended value (the determined value), the impact and the description of each of the configuration parameters.

Row 1081 indicates the name of the specific component for which the details of performance of tuning/optimizations is being displayed in the subsequent rows. Each of rows 1082-1083 indicates the details of a configuration parameter associated with the specific component.

In particular, row 1082 indicates a configuration parameter with name "MaxSpareServers", having no current value (or not able to be determined), and with a recommended value of "5.0" (the corresponding value determined above). Row 1082 also indicated the impact of changing the values of the configuration parameter and a description of the configuration parameter. Similarly row 1083 indicates a configuration parameter with name "MinSpareServers" with a recommended value of "2.0" (the corresponding value determined above).

Thus, an administrator/user may view the determined/recommended values of the configuration parameters associated with (various components of) an enterprise application. As described above, the administrator/user may then set the configuration parameters to the determined/recommended values thereby causing the optimal performance of the enterprise application.

It should be appreciated that the above-described features of advisor tool 150 may be implemented in a combination of one or more of hardware, software and firmware (though embodiments are described as being implemented in the form of software instructions). The description is continued with respect to an embodiment in which various features are operative by execution of corresponding software instructions.

12. Digital Processing System

FIG. 11 is a block diagram illustrating the details of digital processing system 1100 in which various aspects of the present invention are operative by execution of appropriate software instructions. Digital processing system 1100 may correspond to any system (e.g., management system 160) executing advisor tool 150.

Digital processing system 1100 may contain one or more processors such as a central processing unit (CPU) 1110, random access memory (RAM) 1120, secondary memory 1130, graphics controller 1160, display unit 1170, network interface 1180, and input interface 1190. All the components except display unit 1170 may communicate with each other over communication path 1150, which may contain several buses as is well known in the relevant arts. The components of FIG. 11 are described below in further detail.

CPU 1110 may execute instructions stored in RAM 1120 to provide several features of the present invention. CPU 1110 may contain multiple processing units, with each processing unit potentially being designed for a specific task. Alternatively, CPU 1110 may contain only a single general-purpose processing unit. RAM 1120 may receive instructions from secondary memory 1130 using communication path 1150.

Graphics controller 1160 generates display signals (e.g., in RGB format) to display unit 1170 based on data/instructions received from CPU 1110. Display unit 1170 contains a display screen to display the images (e.g., portions of screens depicted in FIGS. 5, 10A and 10B) defined by the display signals. Input interface 1190 may correspond to a keyboard and a pointing device (e.g., touch-pad, mouse) and may be used to provide inputs (e.g., those depicted in FIGS. 5, 10A and 10B). Network interface 1180 provides connectivity to a network (e.g., using Internet Protocol), and may be used to communicate with other connected systems (such as client systems 110A-110B, server systems 190A-190B and database server 180) of FIG. 1.

Secondary memory 1130 may contain hard drive 1135, flash memory 1136, and removable storage drive 1137. Secondary memory 1130 may store the data (e.g., portions of data depicted in FIGS. 4A, 4B, 6, 8, and 9) and software instructions, which enable digital processing system 1100 to provide several features in accordance with the present invention.

Some or all of the data and instructions may be provided on removable storage unit 1140, and the data and instructions may be read and provided by removable storage drive 1137 to CPU 1110. Floppy drive, magnetic tape drive, CD-ROM drive, DVD Drive, Flash memory, removable memory chip (PCMCIA Card, EPROM) are examples of such removable storage drive 1137.

Removable storage unit 1140 may be implemented using medium and storage format compatible with removable storage drive 1137 such that removable storage drive 1137 can read the data and instructions. Thus, removable storage unit 1140 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1140 or hard disk installed in hard drive 1135. These computer program products are means for providing software to digital processing system 1100. CPU 1110 may retrieve the software instructions, and execute the instructions to provide various features of the present invention described above.

13. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

APPENDIX

| Parameter Name | |
|---|---|
| Configuration Parameters of Oracle HTTP Server | |
| MaxClients (OHS) | |
| Description | The MaxClients directive limits the number of clients that can simultaneously connect to your web server, and thus the number of httpd processes. You can configure this parameter in the httpd.conf file up to a maximum of 8K (the default value is 150). |
| Recommendation | Increasing MaxClients when system resources are saturated does not improve performance. When there are no httpd processes available, connection requests are queued in the TCP/IP system until a process becomes available, and eventually clients terminate connections. If you are using persistent connections, you may require more concurrent httpd server processes.<br>For dynamic requests, if the system is heavily loaded, it might be better to allow the requests to queue in the network (thereby keeping the load on the system manageable). The question for the system administrator is whether a timeout error and retry is better than a long response time. In this case, the MaxClients setting could be reduced, as a throttle on the number of concurrent requests on the server.<br>The MaxClients parameter on UNIX systems works like the ThreadsPerChild parameter on Windows systems. |
| Expression Reference | http://httpd.apache.org/docs/2.0/misc/perf-tuning.html<br>From this site:<br>"This procedure for doing this is simple: determine the size of your average Apache process, by looking at your process list via a tool such as top, and divide this into your total available memory, leaving some room for other processes." |
| Impact | If the number of processes created is greater than the physical memory then swapping occurs which reduces performance. Hence a setting is needed to prevent swapping. |
| Expression | Min(avg(ResourceUsage.memory.total) * (user conf %) / Max(d__cProcessInfo.heapMB.value) , 8192) |
| Explanation | The ResourceUsage.memory.total gives the total memory present on the system.<br>The d__cProcessInfo.heapMB.value gives us the average heap size used by an OHS process.<br>The maximum size of MaxClients can only be 8192.<br>MaxClients = Minimum<br>(<br>(Memory to be used by OHS /<br>actual mem used by a single OHS thread),<br>8192) |
| MinSpareServers, MaxSpareServers (OHS) | |
| Description | Server-pool size regulation. |
| Recommendation | Rather than making you guess how many server processes you need, Oracle HTTP Server dynamically adapts to the load it sees, that is, it tries to maintain enough server processes to handle the current load, plus a few spare servers to handle transient load spikes (for example, multiple simultaneous requests from a single Netscape browser). It does this by periodically checking how many servers are waiting for a request. If there are fewer than MinSpareServers, it creates a new spare. If there are more than MaxSpareServers, some of the spares die off. |
| Expression Reference | None. |
| Impact | Too many creation and destroying of servers reduces server performance. Hence a proper setting is required.<br>The avg busy children will be the value the ohs server would have created automatically to maintain the load processing time. |
| Expression | MinSpareServers: round(avgrate(ohs__server.busyChildren.value))<br>MaxSpareServers: round(maxrate(ohs__server.busyChildren.value)) |
| Explanation | The ohs__server.busyChildren.value metric gives the total number of concurrent requests to the server.<br>The rate of ohs__server.busyChildren.value gives us the rate at which we get new requests to the system. We should have average rate spare threads to be able to handle the requests without creating new threads.<br>MinSpareServers = average rate at which new requests are got by OHS.<br>MaxSpareServers = maximum rate at which new requests are got by OHS. |

APPENDIX-continued

| Parameter Name | |
|---|---|
| | StartServers (OHS) |
| Description | Number of servers to start initially. |
| Recommendation | If you expect a sudden load after restart, set this value based on the number child servers required. |
| Impact | The server would have created enough processes to handle the start load which if was smaller than the existing would have caused a slowdown of the system. But if started with this value would give performance at start up. |
| Expression Reference | The same as the recommendation. |
| Expression | startvalue(ohs_server.request.currentThroughput) |
| Explanation | The startvalue function, will look at the number of requests processed immediately after the server startup time.<br>StartSpareServers = The number of requests that hit OHS when OHS is started up.<br>The startvalue (initial load on startup) will be different based on when OHS servers are started. If the business practise is to start servers during low load and not usually bounce then during high load, this value will come out to be low.<br>In case, bouncing of servers happens during high load periods also, this value will be higher, which would reflect the right configuration. |
| | KeepAlive, MaxKeepAliveRequests |
| Description | Whether or not to allow persistent connections (more than one request per connection) |
| Recommendation | These settings allow enough requests per connection and time between requests to reap the benefits of the persistent connections, while minimizing the drawbacks. You should consider the size and behavior of your own user population in setting these values on your system.<br>For example, if you have a large user population and the users make small infrequent requests, you may want to reduce the above settings, or even set KeepAlive to off. If you have a small population of users that return to your site frequently, you may want to increase the settings. |
| Expression Reference | None. |
| Expression | KeepAlive: Set it to ON If (mod_oc4j_general.session.currentPercentage > 20%) else OFF<br>MaxKeepAliveRequests: ((avg(mod_oc4j_destination_metrics.sucReq.currentThroughput) + avg(mod_oc4j_destination_metrics.errReq.currentThroughput)) * avg(mod_oc4j_destination.session.currentPercentage) / 100) / (avg(oc4j_all_instances.session.active)) |
| Explanation | If a good % of requests that are coming into the server are not session requests then keepAlive serves no purpose.<br>The number of requests that are 'session requests'/number of sessions gives us the average number of requests that were recieved for a session. We want to handle atleast those many requests when we stay alive before we die out. |
| | Configuration Parameters of OC4J |
| | min-connections, max-connections (OC4J) |
| Description | Configuration for the JDBC connection pool size. The min-connections option specifies the minimum number of open connections for a pooled data source. |
| Recommendation | For applications that use a database, performance can improve when the data source manages opening a pool of connections, and manages the pool. This can improve performance because incoming requests don't need to wait for a database connection to be established; they can be given a connection from one of the available connections, and this avoids the cost of closing and then reopening connections.<br>By default, the value of min-connections is set to 0. When using connection pooling to maintain connections in the pool, specify a value for min-connections other than 0.<br>For emulated and non-emulated data sources, the min-connections option is treated differently.<br>For emulated data sources, when starting up the initial min-connections connections, connections are opened as they are needed and once the min-connections number of connections is established, this number is maintained.<br>For non-emulated data sources, after the first access to the data source, OC4J then starts the min-connections number of connections and maintains this number of connections. |

APPENDIX-continued

| Parameter Name | |
|---|---|
| | Limiting the total number of open database connections to a number your database can handle is an important tuning consideration. You should check to make sure that your database is configured to allow at least as large a number of open connections as the total of the values specified for all the data sources min-connections options, as specified in all the applications that access the database. |
| Expression Reference | None. |
| Expression | min-connections. avg(JDBC__ConnectionSource.CacheGetConnection.deltaCompleted) + avg (JDBC__DataSource.ConnectionCreated.deltaCompleted) / interval max-connections: max(JDBC__ConnectionSource.CacheGetConnection.deltaCompleted) + max(JDBC__DataSource.ConnectionCreated.deltaCompleted) / interval |
| Explanation | MinConnections = Avg of connections used = Avg of ( connections__from__cache + new connections created in an interval) Max Connections: Max of ( connections__from__cache + new connections created in an interval) Note that this recommendation will work correctly only if the cacheScheme is DYNAMIC__SCHEME where the connections are automatically created if the pool size is not enough. stmt-cache-size (OC4J) |
| Description | To lower the overhead of repeated DB cursor creation and repeated statement parsing and creation, you can use statement caching with database statements. |
| Recommendation | To set the stmt-cache-size attribute, first determine how many distinct statements are issued to the database. Then, set the size of the cache to this number. If you do not know the number of statements that are issued to the database, you can use the JDBC performance metrics to assist you with determining the statement cache size. To use the statement metrics you need to set the Java property oracle.jdbc.DMSStatementMetrics to true for the OC4J. |
| Expression Reference | Same as above. |
| Expression | avgcount(JDBC__Statement.Name) |
| Explanation | The JDBC__Statement metric is collected for each statement run on a given data source. The name metric identifies a distinct statement. On any collection interval taking a count of this metric will give us the distinct statements that have been executed. The average count of distinct statements executed on each interval should give us the cache size that should be required to hold the statements. Stmt__cache__size = average distinct statements executed concurrently. |

What is claimed is:

1. A method of computing the values of a plurality of configuration parameters associated with an application operating in a digital environment, wherein said application uses the values of said plurality of configuration parameters during execution, wherein said application delivers an optimal performance when said plurality of configuration parameters are set to the computed values, said method comprising:

maintaining a rules data indicating a corresponding rule for each of said plurality of configuration parameters, wherein each rule indicates the manner of calculation of the value for the corresponding configuration parameter based on a corresponding set of production metrics, wherein each production metric numerically represents a corresponding characteristic of said digital environment during execution of said application;

receiving an indication that the value of a first configuration parameter is to be computed, wherein said first configuration parameter is contained in said plurality of configuration parameters;

identifying a first rule corresponding to said first configuration parameter based on said rules data, wherein said first rule indicates that said first configuration parameter is calculated based on a first set of production metrics;

determining a corresponding set of values of each of said first set of production metrics; and calculating the value for said first configuration parameter using said first rule and said corresponding set of values of each of said first set of production metrics.

2. The method of claim 1, wherein said determining is performed at a first time instance, said method further comprising:

maintaining a historical data indicating the previous values of each production metric corresponding to a plurality of time instances prior to said first time instance, wherein said determining determines a corresponding first set of values of a first production metric as being equal to the previous values of said first production metric in a first set of time instances, wherein said first production metric is contained in said first set of production metrics and said first set of time instances is contained in said plurality of time instances.

3. The method of claim 2, wherein said rules data further indicates that the values of said first production metric are to be determined based on a specific criteria of a second production metric, said method further comprising:

examining said historical data to determine the previous values of said second production metric corresponding to said plurality of time instances; and identifying a second set of time instances at which the previous values of said second production metric matches said specific criteria;

wherein said determining uses said second set of time instances as said first set of time instances to determine said corresponding first set of values as being equal to the previous values of said first production metric.

4. The method of claim 3, wherein said maintaining said historical data further comprises:

monitoring each production metric during execution of said application in said digital environment;

obtaining the previous values of each production metric corresponding to each of said plurality of time instances; and storing the previous values of each production metric associated with each of said plurality of time instances in a memory, wherein said determining determines said first set of values after retrieving the previous values of said first production metric in said first set of time instances from said memory.

5. The method of claim 1, wherein said application comprises a plurality of components executing on a plurality of systems contained in said digital environment, wherein said plurality of configuration parameters are associated with corresponding one of said plurality of components, said method further comprising:

downloading a plurality of portions of said rules data from corresponding external systems not contained in said plurality of systems, wherein each of said plurality of portions of said rules data indicates rules for calculating configuration parameters corresponding to one of said plurality of components; and merging said plurality of portions of said rules data to form said rules data.

6. The method of claim 1, further comprising displaying the value of said first configuration parameter on a display unit.

7. The method of claim 1, wherein said application comprises an enterprise application containing a HTTP server, wherein said plurality of configuration parameters comprises a StartServers parameter indicating the number of server processes to be started initially in said HTTP server and a MinSpareServers and MaxSpareServers parameters respectively indicating the minimum and maximum number of server processes to be used within said HTTP server.

8. The method of claim 7, wherein said plurality of configuration parameters further comprises a MaxClients parameter indicating the number of clients that can simultaneously connect with said HTTP server, a KeepAlive parameter indicating whether multiple requests can be received from said clients using a single connection, and a MaxKeepAliveRequests parameter indicating the number of said clients that can simultaneously send multiple requests using a single connection.

9. The method of claim 7, wherein said enterprise application further contains a Java run time environment, wherein said plurality of configuration parameters comprises a min-connections and max-connections parameters respectively indicating the minimum and maximum number of connections to be kept open with a database, and a stmt-cache-size parameter indicating the cache size to be used when issuing commands to said database.

10. A computing system operating in a digital environment comprising:

a set of server systems to execute a plurality of applications;

a data store to maintain a rules data indicating a corresponding rule for each of a plurality of configuration parameters used by an application during execution, said application being contained in said plurality of applications, wherein each rule indicates the manner of calculation of the value for the corresponding configuration parameter based on a corresponding set of production metrics, wherein each production metric numerically represents a corresponding characteristic of said digital environment during execution of said application;

a management system to compute the values of said plurality of configuration parameters based on said rules data, wherein said management system is operable to:

receive an indication that the value of a first configuration parameter is to be computed, said first configuration parameter being contained in said plurality of configuration parameters;

identify a first rule corresponding to said first configuration parameter based on said rules data, wherein said first rule indicates that said first configuration parameter is calculated based on a first set of production metrics;

determine a corresponding set of values of each of said first set of production metrics; and calculate the value for said first configuration parameter using said first rule and said corresponding set of values of each of said first set of production metrics, wherein said application delivers an optimal performance when said plurality of configuration parameters are set to the computed values.

11. The computing system of claim 10, further comprising:

a monitoring system to maintain a historical data indicating the previous values of each production metric corresponding to a plurality of time instances prior to a time instance at which said management system determines said corresponding set of values, wherein said management system determines a corresponding first set of values of a first production metric as being equal to the previous values of said first production metric in a first set of time instances, said first production metric being contained in said first set of production metrics and said first set of time instances being contained in said plurality of time instances.

12. The computing system of claim 11, wherein said rules data further indicates that the values of said first production metric are to be determined based on a specific criteria of a second production metric, wherein said management system examines said historical data to determine the previous values of said second production metric corresponding to said plurality of time instances to identify a second set of time instances at which the previous values of said second production metric matches said specific criteria, wherein said management system uses said second set of time instances as said first set of time instances to determine said corresponding first set of values as being equal to the previous values of said first production metric.

13. The computing system of claim 12, wherein said monitoring system monitors each production metric during execution of said application in said digital environment, obtains the previous values of each production metric corresponding to each of said plurality of time instances, and then stores the previous values of each production metric associated with each of said plurality of time instances in a memory, wherein said management system determines said first set of values after retrieving the previous values of said first production metric in said first set of time instances from said memory.

14. The computing system of claim 10, further comprising:

a set of external systems to provide a plurality of portions of said rules data, said set of external systems not being the same as said set of server systems, wherein each of said plurality of portions of said rules data indicates rules for calculating configuration parameters corresponding to one of a plurality of components constituting said application, wherein said plurality of components are executed on said set of server systems, wherein said management system downloads said plurality of portions of said rules data from said set of external systems and then merges said plurality of portions of said rules data to form said rules data.

15. A machine readable medium storing one or more sequences of instructions for causing a system to compute the values of a plurality of configuration parameters associated with an application operating in a digital environment, wherein said application uses the values of said plurality of configuration parameters during execution, wherein said application delivers an optimal performance when said plurality of configuration parameters are set to the computed values, wherein execution of said one or more sequences of instructions by one or more processors contained in said system causes said system to perform the actions of:

maintaining a rules data indicating a corresponding rule for each of said plurality of configuration parameters, wherein each rule indicates the manner of calculation of the value for the corresponding configuration parameter based on a corresponding set of production metrics, wherein each production metric numerically represents a corresponding characteristic of said digital environment during execution of said application;

receiving an indication that the value of a first configuration parameter is to be computed, wherein said first configuration parameter is contained in said plurality of configuration parameters;

identifying a first rule corresponding to said first configuration parameter based on said rules data, wherein said first rule indicates that said first configuration parameter is calculated based on a first set of production metrics;

determining a corresponding set of values of each of said first set of production metrics; and calculating the value for said first configuration parameter using said first rule and said corresponding set of values of each of said first set of production metrics.

16. The machine readable medium of claim 15, wherein said determining is performed at a first time instance, further comprising one more instructions for:

maintaining a historical data indicating the previous values of each production metric corresponding to a plurality of time instances prior to said first time instance, wherein said determining determines a corresponding first set of values of a first production metric as being equal to the previous values of said first production metric in a first set of time instances, wherein said first production metric is contained in said first set of production metrics and said first set of time instances is contained in said plurality of time instances.

17. The machine readable medium of claim 16, wherein said rules data further indicates that the values of said first production metric are to be determined based on a specific criteria of a second production metric, further comprising one or more instructions for:

examining said historical data to determine the previous values of said second production metric corresponding to said plurality of time instances; and identifying a second set of time instances at which the previous values of said second production metric matches said specific criteria;

wherein said determining uses said second set of time instances as said first set of time instances to determine said corresponding first set of values as being equal to the previous values of said first production metric.

18. The machine readable medium of claim 17, wherein said maintaining said historical data further comprises:

monitoring each production metric during execution of said application in said digital environment;

obtaining the previous values of each production metric corresponding to each of said plurality of time instances; and storing the previous values of each production metric associated with each of said plurality of time instances in a memory, wherein said determining determines said first set of values after retrieving the previous values of said first production metric in said first set of time instances from said memory.

19. The machine readable medium of claim 15, wherein said application comprises a plurality of components executing on a plurality of systems contained in said digital environment, wherein said plurality of configuration parameters are associated with corresponding one of said plurality of components, further comprising one or more instructions for:

downloading a plurality of portions of said rules data from corresponding external systems not contained in said plurality of systems, wherein each of said plurality of portions of said rules data indicates rules for calculating configuration parameters corresponding to one of said plurality of components; and merging said plurality of portions of said rules data to form said rules data.

20. The machine readable medium of claim 15, further comprising one or more instructions for displaying the value of said first configuration parameter on a display unit.

\* \* \* \* \*

UNITED STATES PATENT AND TRADEMARK OFFICE
CERTIFICATE OF CORRECTION

PATENT NO. : 8,117,146 B2
APPLICATION NO. : 12/106357
DATED : February 14, 2012
INVENTOR(S) : Sankar et al.

Page 1 of 1

It is certified that error appears in the above-identified patent and that said Letters Patent is hereby corrected as shown below:

In column 3, line 67, delete "10A-110B," and insert -- 110A-110B, --, therefor.

In column 9, line 32, delete "instances rollup" and insert -- instances_rollup --, therefor.

In column 11, line 43, delete "request. current" and insert -- request.current --, therefor.

In column 15, line 9, delete "Children value))" and insert -- Children.value)) --, therefor.

In column 15, line 19, delete "Children value))" and insert -- Children.value)) --, therefor.

In column 19, line 34, delete "value) ," and insert -- value), --, therefor.

In column 21, line 50, delete "recieved" and insert -- received --, therefor.

In column 21, line 51, delete "atleast" and insert -- at least --, therefor.

In column 21, line 70-71, delete "min-connections connections, connections" and insert -- min-connections, connections --, therefor.

In column 23, line 11, delete "minconnections." and insert -- minconnections: --, therefor.

In column 23, line 21, delete "( connections" and insert -- (connections --, therefor.

In column 27, line 57, in Claim 16, delete "one more" and insert -- one or more --, therefor.

Signed and Sealed this
First Day of May, 2012

David J. Kappos
*Director of the United States Patent and Trademark Office*